United States Patent
Henzler et al.

(10) Patent No.: US 9,891,081 B2
(45) Date of Patent: Feb. 13, 2018

(54) METHOD FOR PRODUCING A SENSOR HOUSING AND CORRESPONDING SENSOR HOUSING

(71) Applicant: Robert Bosch GmbH, Stuttgart (DE)

(72) Inventors: Stephan Henzler, Gormaringen (DE); Alexander Herrmann, Reutlingen (DE); Wolfgang Woernle, Neustetten (DE); Benjamin Bertsch, Lichtenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/758,137

(22) PCT Filed: Dec. 19, 2013

(86) PCT No.: PCT/EP2013/077529
§ 371 (c)(1),
(2) Date: Jun. 26, 2015

(87) PCT Pub. No.: WO2014/102151
PCT Pub. Date: Jul. 3, 2014

(65) Prior Publication Data
US 2015/0330859 A1   Nov. 19, 2015

(30) Foreign Application Priority Data

Dec. 27, 2012   (DE) .......... 10 2012 224 380
Dec. 27, 2012   (DE) .......... 10 2012 224 383
(Continued)

(51) Int. Cl.
*G01D 11/24*   (2006.01)
*G01L 19/14*   (2006.01)

(52) U.S. Cl.
CPC ............ *G01D 11/245* (2013.01); *G01L 19/14* (2013.01); *G01L 19/143* (2013.01); *G01L 19/147* (2013.01); *Y10T 29/49828* (2015.01)

(58) Field of Classification Search
CPC ..... G01L 19/143; G01L 19/14; G01L 19/147; G01D 11/245; Y10T 29/49828
See application file for complete search history.

(56) References Cited

U.S. PATENT DOCUMENTS 3,474,971 A * 10/1969 Goodrich .............. F23D 11/108
                                                        126/403
4,355,460 A * 10/1982 Gellert ................... B22D 19/00
                                                        219/424
(Continued)

FOREIGN PATENT DOCUMENTS

DE   10 2007 026 446 A1   12/2008

OTHER PUBLICATIONS

English Translation of International Patent Application Publication to Henzler et al (WO 2008148652 A2).*
(Continued)

*Primary Examiner* — Peter Macchiarolo
*Assistant Examiner* — Samir M Shah
(74) *Attorney, Agent, or Firm* — Maginot, Moore & Beck LLP

(57) ABSTRACT

A method for producing a sensor housing comprises forming three seals including a first annular seal and a second annular seal connected to each other by a connecting web formed materially integral in a unipartite fashion with the first annular seal and the second annular seal, and positioning the first annular seal and the second annular seal on a housing shell of the sensor housing.

7 Claims, 3 Drawing Sheets

(30) Foreign Application Priority Data

| Jan. 17, 2013 | (DE) | .......................... 10 2013 200 631 |
| Jan. 17, 2013 | (DE) | .......................... 10 2013 200 633 |
| Jan. 17, 2013 | (DE) | .......................... 10 2013 200 668 |
| May 8, 2013 | (DE) | .......................... 10 2013 208 534 |

(56) References Cited

U.S. PATENT DOCUMENTS

| 4,403,405 | A | * | 9/1983 | Gellert | ................ | B29C 45/2737 |
| | | | | | | 219/421 |
| 4,618,322 | A | * | 10/1986 | Lagasse | ............. | B29C 33/0044 |
| | | | | | | 249/91 |
| 4,771,164 | A | * | 9/1988 | Gellert | ................ | B29C 45/2711 |
| | | | | | | 219/421 |
| 4,777,348 | A | * | 10/1988 | Gellert | ................... | B29C 45/30 |
| | | | | | | 219/421 |
| 5,223,224 | A | * | 6/1993 | Dremel | ............... | G01N 35/085 |
| | | | | | | 356/244 |
| 5,437,093 | A | * | 8/1995 | Gellert | ................. | B23P 15/007 |
| | | | | | | 164/108 |
| 5,718,281 | A | * | 2/1998 | Bartalone | ............. | F01P 11/029 |
| | | | | | | 165/119 |
| 5,941,673 | A | * | 8/1999 | Hayakawa | ............ | B21D 43/20 |
| | | | | | | 414/225.01 |
| 6,009,616 | A | * | 1/2000 | Gellert | .................... | B29C 45/27 |
| | | | | | | 219/540 |
| 6,365,424 | B1 | * | 4/2002 | Bauer | ................. | G01D 11/245 |
| | | | | | | 257/690 |
| 6,647,793 | B2 | * | 11/2003 | Dirmeyer | ............ | G01D 11/245 |
| | | | | | | 73/273 |
| 6,992,269 | B2 | * | 1/2006 | Renwick | ............ | B29C 45/2737 |
| | | | | | | 219/426 |
| 7,380,458 | B1 | * | 6/2008 | Date | .................... | G01D 11/245 |
| | | | | | | 180/274 |
| 7,454,976 | B2 | * | 11/2008 | Wanami | ............. | B60R 21/0136 |
| | | | | | | 361/283.1 |
| 8,707,783 | B2 | * | 4/2014 | Ludwig | ................ | G01D 11/245 |
| | | | | | | 73/431 |
| 2001/0009059 | A1 | * | 7/2001 | Chiku | ................. | B29C 45/0046 |
| | | | | | | 29/450 |
| 2011/0012378 | A1 | * | 1/2011 | Ueno | ................ | B29C 45/14811 |
| | | | | | | 292/336.3 |
| 2011/0174071 | A1 | * | 7/2011 | Ludwig | ................ | G01D 11/245 |
| | | | | | | 73/431 |
| 2011/0291644 | A1 | * | 12/2011 | Kanemoto | .......... | G01P 15/0802 |
| | | | | | | 324/162 |
| 2011/0311332 | A1 | * | 12/2011 | Ishman | ................. | F16F 13/007 |
| | | | | | | 411/347 |
| 2012/0000291 | A1 | * | 1/2012 | Christoph | ............... | F16B 21/02 |
| | | | | | | 73/700 |
| 2013/0055822 | A1 | * | 3/2013 | Frank | .................... | G01D 11/30 |
| | | | | | | 73/756 |
| 2013/0212858 | A1 | * | 8/2013 | Herzinger | ............ | F16B 5/0642 |
| | | | | | | 29/428 |

OTHER PUBLICATIONS

International Search Report corresponding to PCT Application No. PCT/EP2013/077529, dated Jun. 2, 2014 (German and English language document) (5 pages).

* cited by examiner

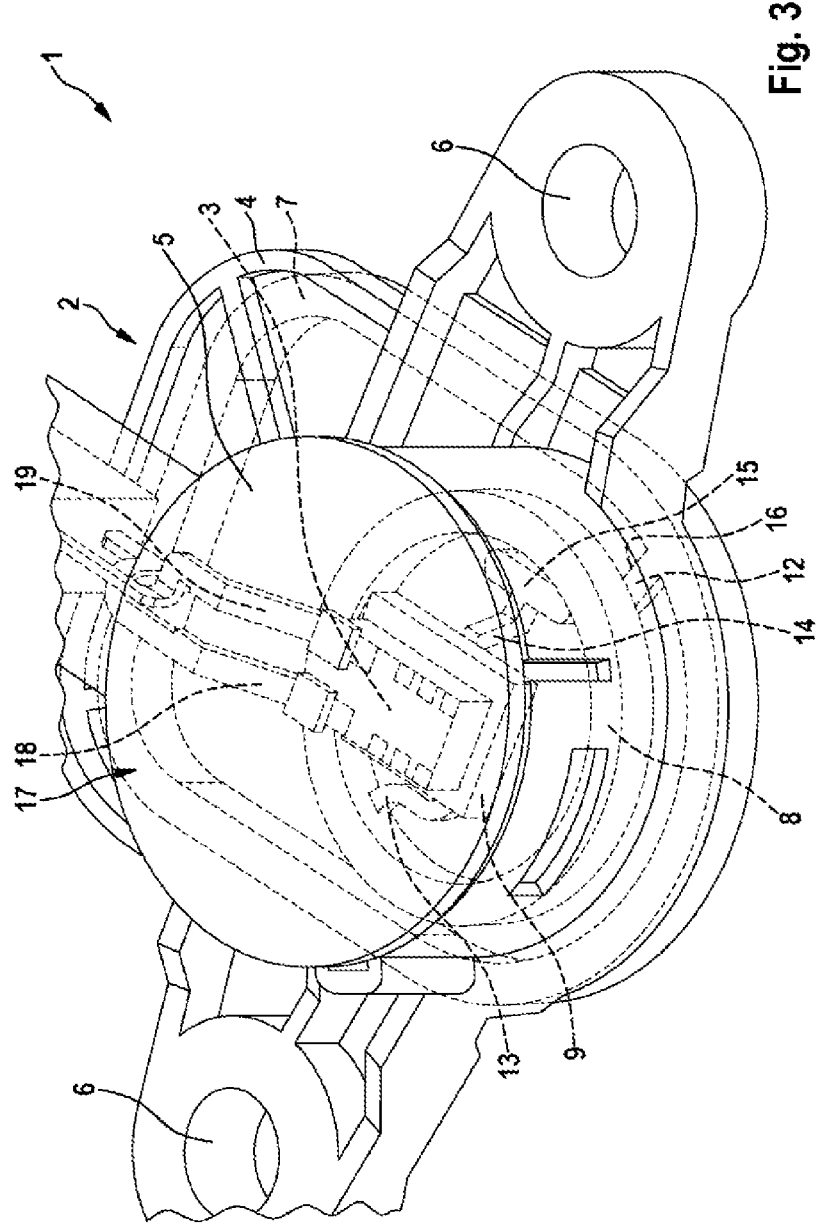

US 9,891,081 B2

METHOD FOR PRODUCING A SENSOR HOUSING AND CORRESPONDING SENSOR HOUSING

This application is a 35 U.S.C. § 371 National Stage Application of PCT/EP2013/077529 filed on Dec. 19, 2013, which claims the benefit of priority to Serial Nos. DE 10 2012 224 380.1 filed on Dec. 27, 2012 in Germany, DE 10 2012 224 383.6 filed on Dec. 27, 2012 in Germany, DE 10 2013 200 631.4 filed on Jan. 17, 2013 in Germany, DE 10 2013 200 633.0 filed on Jan. 17, 2013 in Germany, DE 10 2013 200 668.3 filed on Jan. 17, 2013 in Germany, and DE 10 2013 208 534.6 filed on May 8, 2013 in Germany, the disclosures of which are all incorporated herein by reference in their entirety.

The disclosure relates to a method for producing a sensor housing which has at least one housing shell and multiple seals which are arranged on the housing shell and which are of closed encircling form. The disclosure also relates to a sensor housing.

BACKGROUND

The sensor housing is for example a constituent part of a sensor arrangement, in particular of a pressure sensor arrangement. In the latter case, the sensor housing serves for accommodating a pressure sensor. The sensor arrangement is preferably a constituent part of a safety device of a motor vehicle. In particular, it serves for the activation of an airbag, for example of a side airbag. In this case, the sensor housing is preferably arranged on an intermediate wall in a side door of the motor vehicle. The intermediate wall separates the side door into a wet chamber and a dry chamber, wherein the sensor housing is preferably arranged in the dry chamber, though the pressure sensor arrangement serves for detecting a pressure in the wet chamber. For example, provision is made for the pressure in the wet chamber to be monitored, and for the airbag, in particular the side airbag, to be triggered, in the event of a sudden change in pressure with certain characteristics, for example in the event of a sudden increase in pressure.

To protect the sensor arranged in the sensor housing from external influences and also permit separation between the wet chamber and the dry chamber, multiple seals are arranged on the sensor housing. Said seals are preferably of closed encircling form, that is to say in particular are of annular form and are consequently for example of circular ring-shaped, oval or stadium-shaped form. The sensor housing is normally produced by virtue of the housing shell being produced or provided and, subsequently, the seals being injection-molded onto the housing shell. This is however cumbersome, because the formation of the seals must be performed in multiple working steps.

SUMMARY

By contrast, the method for producing a sensor housing of the present disclosure has the advantage that simple and inexpensive production of the sensor housing and in particular of the seals is possible. This is achieved according to the disclosure in that, during the formation of the seals, in each case two of the seals are connected to one another by way of a connecting web which is formed in unipartite fashion and materially integrally with the seals. The seals are thus provided on the sensor housing not separately from one another. Rather, the seals are connected to one another by way of the at least one connecting web. In this way, it is possible for the seals to be formed during a single production step. In principle, it is possible for any desired number of seals to be provided. It is however particular preferable for at least three or at least four seals to be provided on the housing shell. It is now the case that a connecting web is provided between in each case two of said seals, such that in the presence of a corresponding number of seals, it may also be the case that multiple connecting webs are provided.

The housing shell is composed for example of a plastic, in particular of a thermoplastic. The seal is produced in particular from silicon, in particular by way of a silicon injection molding process, such that the seal is in the form of a silicon injection-molded seal. The connecting webs may, like the seals, be permanently fastened to the housing shell. Provision may however also be made for the connecting webs to be removed after the formation of the seals.

In an advantageous refinement of the disclosure, it is provided that the following steps are carried out: providing the housing shell, placing the housing shell into a casting mold such that multiple steel-receiving channels which are of closed form in a circumferential direction are formed, wherein in each case two of the seal-receiving channels are connected to one another in terms of flow by way of an overflow channel, and introducing a casting material via a single one of the seal-receiving channels at an injection point, until all of the seal-receiving channels are filled with the casting material, in order to form the seals in all of the seal-receiving channels. The seals are injection-molded onto the housing shell. For this purpose, the seal-receiving channels are, in relation to the housing shell, arranged at the position and with the dimensions of the seals to be produced.

The seal-receiving channels are formed jointly by the housing shell and by the casting mold. It is formed as a seal-receiving groove in the housing shell. The further region of the seal-receiving channels is provided by the casting mold. It may also be provided that the housing shell is flat in the region of the seals to be formed, and the seal-receiving channels are provided entirely in the casting mold. Likewise, the housing shell may, in the region of the seal-receiving channels provided in the casting mold, have projections which protrude into said seal-receiving channels.

To produce the connecting web, the overflow channel is provided, which connects in each case two of the seal-receiving channels to one another in terms of flow. When the casting material is introduced into one of the seal-receiving channels, therefore, the casting material can, when said seal-receiving channel has been adequately filled, flow via the overflow channel into the seal-receiving channel connected thereto in terms of flow, and likewise fills said seal-receiving channel. Thus, the seals which are present or to be formed in said seal-receiving channels can be produced in a single working step. The overflow channel may, analogously to the seal-receiving channels, be present entirely in the housing shell or entirely in the casting mold or formed in each case partially in the housing shell and partially in the casting mold.

Here, the overflow channel is preferably formed, in particular delimited, jointly by the housing shell and by the casting mold. It may however also be provided that the overflow channel is at least regionally delimited entirely by the housing shell, in particular if it is present in the form of an aperture which extends through the housing shell.

As already indicated above, after the insertion of the housing shell into the casting mold, the casting material is introduced. The casting material is introduced into only a single one of the seal-receiving channels, from which the casting material is distributed via the at least one overflow channel into the seal-receiving channels that are situated downstream in terms of flow. Casting material is introduced at the injection point until all of the seal-receiving channels have been filled, in particular completely filled, with the casting material. As a result of the introduction of the casting material and a subsequent hardening process, the seals are formed in the seal-receiving channels. In this case, the casting material is selected so as to form a connection with the housing shell. After the hardening process, the seals are thus connected to the housing shell such that the casting mold can be readily removed, but the seals remain on the housing shell and are held there securely and permanently.

A further refinement of the disclosure provides that at least two of the seal-receiving channels are formed on opposite sides of the housing shell, wherein at least one of the overflow channels is at least partially in the form of an aperture which extends through the housing shell. With regard to a possible assembled situation of the sensor housing, this means that one of the seal-receiving channels, and consequently the corresponding seal, faces toward the intermediate wall of the side door of the motor vehicle, whereas the other seal-receiving channel and the corresponding seal are present on that side of the housing shell which faces away from the intermediate wall.

To achieve this, it is necessary to provide the aperture, which extends through the housing shell and, as viewed in cross section, is surrounded over the full circumference by the housing shell. It is not necessary for the aperture to form the entire overflow channel, though this may self-evidently be provided. Rather, the aperture may form only a part of the overflow channel.

In a further preferred refinement of the disclosure, it is provided that at least two of the seal-receiving channels are formed at different positions in a vertical direction and/or in a radial direction. Again as seen in the assembled situation, the vertical direction refers to a direction along an axis perpendicular to the intermediate wall. In this case, the radial direction is perpendicular to the vertical direction. The seal-receiving channels and consequently the seals may now be arranged fundamentally differently. In particular, they differ in terms of their arrangement in the vertical direction and/or in the radial direction and/or in terms of their corresponding dimensions. For example, it may be provided that the seal-receiving channels have different dimensions and, as seen in plan view, are arranged so as to be nested one inside the other. An example for the arrangement of the seal-receiving channels in different vertical positions has already been discussed above. If the seals or the seal-receiving channels are provided on the opposite sides of the housing shell, they are provided at different positions in a vertical direction.

In a further refinement of the disclosure, it is provided that the seal-receiving channels are designed such that all of the seal-receiving channels extend in a circumferential direction all the way around an imaginary common axis. Said common axis runs for example in the vertical direction as already defined above. The seal-receiving channels are now arranged such that the seals that are later formed all run in a circumferential direction around said common axis and in particular extend all the way around said axis, such that the seals which are of closed encircling form are formed. It is preferably provided that, as seen in plan view, that is to say in the direction of the common axis, the seal-receiving channels are spaced apart from one another, that is to say do not overlap, in a radial direction.

A refinement of the disclosure provides that an overflow chamber is formed in addition to the seal-receiving channels, wherein that one of the seal-receiving channels which is arranged furthest downstream as viewed in the flow direction of the casting material is connected in terms of flow via a further overflow channel to the overflow chamber. Analogously to the seal-receiving channels, the overflow chamber may be provided entirely in the housing shell, entirely in the casting mold or both in the housing shell and in the casting mold. The overflow chamber, too, is however formed jointly by the housing shell and by the casting mold, that is to say is at least regionally delimited by each of these. The overflow chamber serves for receiving excess casting material after the seal-receiving channels have been completely filled with the casting material.

In this way, cavities, air inclusions in the casting material and the like are forced out of the seal-receiving channels into the overflow chamber. Incomplete filling of the seal-receiving channels by injection is also prevented. Correspondingly, the seals can be produced with high quality and in very reliable fashion by way of the introduction of the casting material into the seal-receiving channels and subsequently into the overflow chamber. The overflow chamber is connected via the overflow channel to that seal-receiving channel which is situated furthest downstream, that is to say is furthest remote from the injection point in terms of flow. That which has been already stated above for the overflow channel applies to the further overflow channel; said further overflow channel consequently likewise constitutes an overflow channel of said type.

In a preferred refinement of the disclosure, it is provided that the injection point is arranged so as to be situated opposite that one of the overflow channels which is assigned to the same one of the seal-receiving channels as the injection point. That one of the seal-receiving channels which is arranged furthest upstream has the injection point and the overflow channel or one of the overflow channels. To make it possible for said seal-receiving channel to be filled as completely as possible, the overflow channel or the opening point of the overflow channel into the seal-receiving channel is arranged as far remote from the injection point as possible in terms of flow. When the casting material reaches the overflow channel during the introduction process, the seal-receiving channel has correspondingly already been completely or at least almost completely filled with the casting material.

A further refinement of the disclosure provides that two of the overflow channels which open at opening points into the same one of the seal-receiving channels are designed such that the opening points are situated oppositely with respect to said seal-receiving channel. The seal-receiving channel thus has two of the overflow channels, wherein the above-mentioned further overflow channel is also to be regarded as an overflow channel of said type. The same principles as those for the arrangement of injection point and overflow channel with respect to one another now apply. The two overflow channels or the opening points thereof should be provided as far remote from one another as possible in terms of flow at the seal-receiving channel. Correspondingly, said overflow channels are situated oppositely with respect to said seal-receiving channel. The complete filling of the seal-receiving channel with the casting material, as already described above, is thus ensured.

Finally, it may be provided that, during an assembly process, a housing cover is placed in sealing contact with at least one of the seals such that the seal is forced in the direction of the aperture in order to impart a sealing covering action. During the assembly process, the housing cover is fastened to the housing shell. After the assembly process, the housing cover is in sealing contact with one of the seals arranged on the housing shell. In particular, the housing cover bears sealingly against the seal over the full area. Said seal is preferably assigned to that one of the overflow channels which is provided at least partially as an aperture. To prevent an ingress of foreign particles through said aperture, it is now the intention for the housing cover, after the assembly process, to force the seal in the direction of the aperture, specifically such that the seal engages sealingly over, and closes off, the aperture.

The disclosure also relates to a sensor housing having at least one housing shell and having multiple seals which are arranged on the housing shell and which are of closed encircling form. Here, it is provided that in each case two of the seals are connected to one another by way of a connecting web which is formed in unipartite fashion and materially integrally with the seals. The advantages of such a refinement of the sensor housing or of such an approach have already been indicated. The sensor housing and the corresponding method may be refined in accordance with the above statements, such that in this regard, reference is made to said statements. The seals and the connecting web are formed in unipartite fashion and materially integrally. This means that they are cohesively connected to one another and are composed of the same material. They are preferably produced during the same working step, wherein said production is performed virtually simultaneously during a single casting process.

BRIEF DESCRIPTION OF THE DRAWINGS

The disclosure will be discussed in more detail below on the basis of the exemplary embodiments illustrated in the drawing, without the disclosure being restricted to these. In the drawings:

FIG. 3 is an illustration of the assembled sensor arrangement.

DETAILED DESCRIPTION

Figure 1:
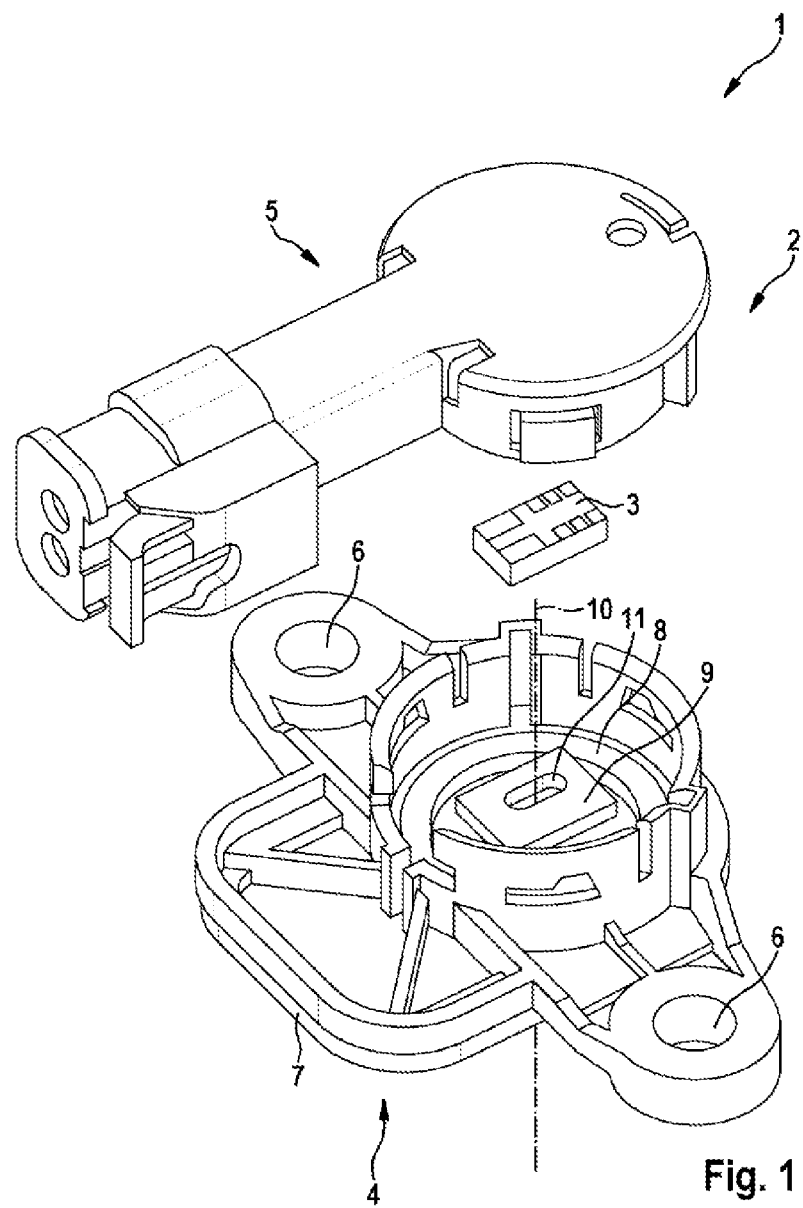
FIG. 1 is an exploded illustration of a sensor arrangement, having a sensor housing which comprises at least a housing shell and a housing cover, and having a sensor.

FIG. 1 is an exploded illustration of a sensor arrangement 1, in particular of a pressure sensor arrangement. The sensor arrangement 1 has, in particular, a sensor housing 2 and a sensor 3, in particular a pressure sensor. In this case, the sensor housing 2 is composed of a housing shell 4 and of a housing cover 5. During assembly of the sensor arrangement 1, the sensor 3 is placed into the sensor housing 2, wherein the housing cover 5 closes off the housing shell 4. The sensor housing 2, in particular the housing shell 4, has fastening points 6 by means of which it can be fastened, for example to an intermediate wall of a side door of a motor vehicle.

The sensor housing 2 or the housing shell 4 has multiple seals 7, 8 and 9 which are each of closed encircling form. In this case, all of the seals 7, 8 and 9 extend all the way around an imaginary common axis 10 in a circumferential direction (with respect to precisely said axis 10). The seal 7 is in the form of a contact seal which, after assembly of the sensor arrangement 1, bears against a counterpart surface which is formed for example by a region of the intermediate wall of the side door. By contrast, the seal 8 serves to realize sealing closure between housing shell 4 and housing cover 5. Thus, when the housing cover 5 is assembled on the housing shell 4, a sealing surface of the housing cover 5 forms a sealing connection with the seal 8 over the full area and over the entire circumference, such that an interior space (not separately designated here) of the sensor housing 2, in which interior space the sensor 3 is arranged, is sealingly closed off with respect to surroundings of the sensor arrangement 1.

The seal 9 serves as a support surface for the sensor 3 and for sealing off a fluidic connection from the outside surroundings to the sensor 3 via the interior space of the sensor housing 2. The fluidic connection is provided in this case by way of an aperture 11 of the housing shell 4, said aperture being completely surrounded in a circumferential direction by the seal 9. When the sensor 3 is arranged on the seal 9, it is subsequently the case that only a region of the sensor facing toward the aperture 11 is fluidically connected via said aperture to the outside surroundings. The aperture 11 extends all the way through the housing shell 4 proceeding from the sensor 3 in the direction of the axis 10, that is to say also extends, at an opening point, through that side which is situated opposite the interior space of the sensor housing 2. In this case, the seal 7 preferably extends all the way around said opening point in a circumferential direction.

Figure 2:
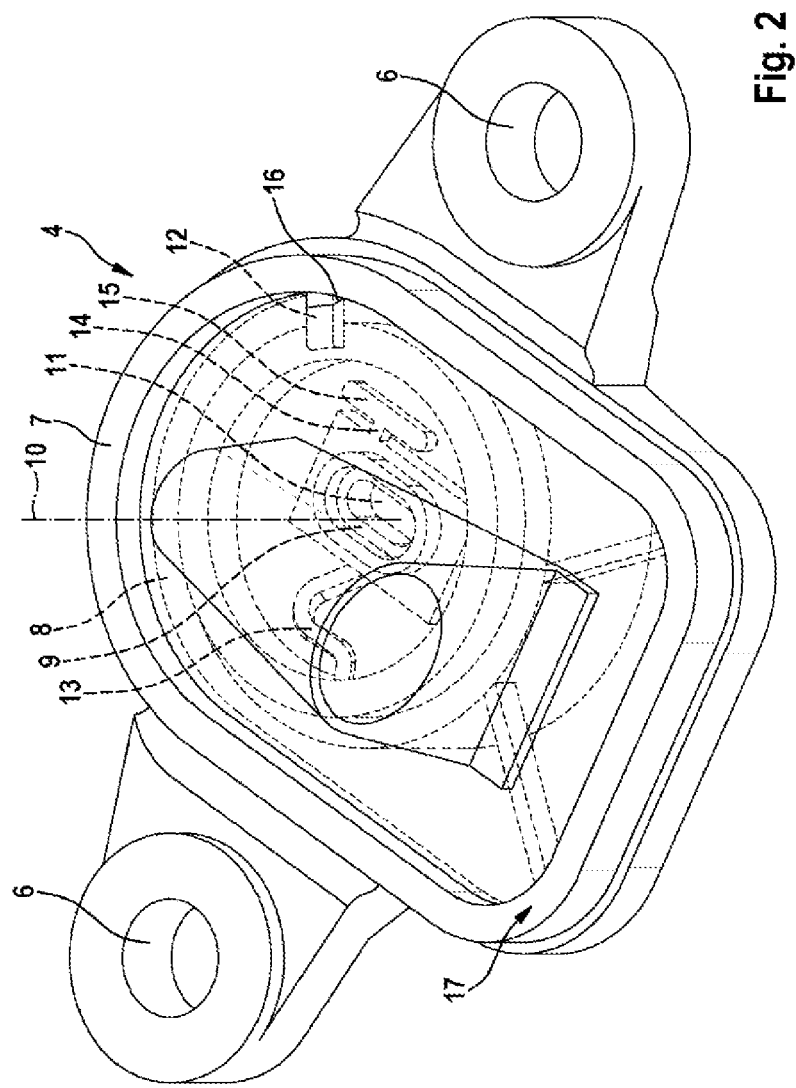
FIG. 2 shows a detail view of the housing shell.

FIG. 2 shows a detail view of the housing shell 4, with some regions being illustrated transparently in order to render the seals 8 and 9 visible. Reference is basically made to the statements made above. It is correspondingly clear that the seal 7, on the one hand, and the seals 8 and 9, on the other hand, are arranged on opposite sides of the housing shell 4. It can be seen that the seal 7 is connected in unipartite fashion and materially integrally by way of a connecting web 12 to the seal 8, the seal 8 is connected in unipartite fashion and materially integrally by way of a connecting web 13 to the seal 9, and the seal 9 is connected in unipartite fashion and materially integrally by way of a further connecting web 14 to an overflow 15. Because the seals 7, 8 and 9 are provided on opposite sides of the housing shell 4, the connecting web 12 extends through an aperture 16 of the housing shell 4. The aperture 16 opens in, for example on that side of the housing shell 4 which faces toward the seal 7, directly below the seal 7, whereas said aperture opens in, on the other side of the housing shell 4, directly below the seal 8.

The seals 7, 8 and 9, the connecting webs 12, 13 and 14 and the overflow 15 are produced by means of a casting mold which is not shown here. Said casting mold is, in order to produce the sensor housing 2 or the housing shell 4, placed into the latter such that multiple seal-receiving channels which are of closed form in a circumferential direction are formed. In each case two of said seal-receiving channels are now connected to one another in terms of flow by way of an overflow channel. Subsequently, a casting material is introduced via a single one of the seal-receiving channels at injection point, until all of the seal-receiving channels have been filled with the casting material.

The seals 7, 8 and 9 are now present in the region of the seal-receiving channels, whereas the connecting webs 12, 13 and 14 are realized by the overflow channels. Excess casting material, or air inclusions or cavities still contained in the casting material, are forced via the overflow channel, which forms a connecting web 14, into an overflow chamber, which thereafter forms the overflow 15. In this way, the seals 7, 8 and 9 can be produced in a single working step. The introduction of the casting material is performed at an injection point 17, which is indicated here merely by way of example.

FIG. 3 shows the sensor arrangement 1 in the assembled form. It is now clear that the sensor 3 lies on the seal 9. Said sensor is electrically contacted by way of terminals 18 and 19, which are thus arranged in particular in the dry chamber of the side door of the motor vehicle. In this illustration, it is clear that the seals 7, 8 and 9 are formed in each case at different positions in a vertical direction, that is to say along the axis 10, and in a radial direction.

The invention claimed is:

1. A method for producing a sensor housing, comprising:

forming three seals a first, a second and a third annular seal connected to each other by respective connecting webs formed materially integral in a unipartite fashion with the first, second and third annular seals; and positioning the first, second and third annular seals on a housing shell of the sensor housing, further comprising:

placing the housing shell into a casting mold having three seal-receiving channels of closed form in a circumferential direction, the three seal-receiving channels being fluidly connected to each other by respective overflow channels;

introducing a casting material via one of the three seal-receiving channels at an injection point, until the three seal-receiving channels are filled with the casting material, in order to form the three seals in the three seal-receiving channels, and wherein one of the three seal-receiving channels, which is located furthest downstream as viewed in a flow direction of the casting material, is fluidly connected via a further overflow channel to an overflow chamber configured to receive the casting material.

2. The method as claimed in claim 1, wherein:

at least two of the three seal-receiving channels are formed on opposite sides of the housing shell; and at least one overflow channel is formed at least partially by an aperture extending through the housing shell.

3. The method as claimed in claim 1, wherein two of the three seal-receiving channels are formed at different positions in a vertical direction.

4. The method as claimed in claim 1, wherein the three seal-receiving channels extend in the circumferential direction around a common axis such that the three seal-receiving channels completely encircle the common axis.

5. The method as claimed in claim 1, wherein the injection point is located opposite an overflow channel assigned to one of the three seal-receiving channels with the injection point.

6. The method as claimed in claim 1, wherein two of the three overflow channels open at opening points into the same one of the three seal-receiving channels, the opening points being located oppositely with respect to a third of the three seal-receiving channels.

7. The method as claimed in claim 1, further comprising: placing a housing cover in sealing contact with at least one of the three annular seals such that the first annular seal is forced in the direction of an aperture in order to impart a sealing covering action.

* * * * *